Sept. 20, 1960     G. A. KLOTZBAUGH     2,953,712

STORAGE DEVICE

Filed Feb. 28, 1958

United States Patent Office 2,953,712
Patented Sept. 20, 1960

2,953,712
STORAGE DEVICE

George A. Klotzbaugh, Penn Hills, Pa., assignor to Westinghouse Electric Corporation, East Pittsburgh, Pa., a corporation of Pennsylvania Filed Feb. 28, 1958, Ser. No. 718,340

8 Claims. (Cl. 315—12)

This invention relates to electron discharge devices and, more particularly, to devices in which an input signal may be stored in the form of a charge or voltage and later converted into an output signal.

One particular embodiment of my invention is a viewing-type storage tube in which the visual display of an image may be maintained for an extended period of time after writing has ceased. Storage-type cathode-ray display tubes have been proposed and utilized for display systems, such as in television and radar, in order to obtain brighter images and to display different types of information simultaneously on the same viewing screen. In general, the storage tube consists of a foraminated storage grid member which controls the electron flow between a flooding-type electron gun and a luminescent screen. A space distributed charge or voltage image is created on the surface of the storage grid by an intensity modulated scanning or writing beam, and the charge or voltage image recorded on the grid controls or modulates the flow of electrons from the flooding gun to the display screen and thus a light image of the charge pattern is produced on the screen. The charge pattern of the storage grid is normally created by secondary emission from the surface of the grid. The storage-type tube is more fully described in "Storage Tubes and Their Basic Principles," by M. Knoll and B. Kazen, published by J. Wiley and Sons, Inc., 1952.

The utility of a storage tube would be greatly increased if it were possible to superimpose two independent images on the storage surface. This would require that after a first image is written on the storage surface by suitable means, a second image could be independently superimposed on the storage grid without affecting the first image. It would also be necessary to provide means of removing the second image without disturbing the other stored image.

For example, it might be desirable that the first image be a radar map slowly changing with time. The second image might be a pair of perpendicular straight lines indicating the location of an aircraft or a moving target. This second type information would, of course, be changing at a faster rate of speed than that of the first or radar map information. It would be desirable, therefore, that as the aircraft moved, its moving image on the screen would not erase the radar image of the surrounding landscape.

Previous attempts to achieve image superposition in a charge storage viewing tube have had limited success because of the interaction between the two stored images. The normal procedure was to utilize the storage action of the storage grid in order to obtain and enhance brightness with respect to the radar map display and utilize conventional type scanning to excite the screen with respect to the movement of the aricraft. This procedure has been found to be quite difficult due to interaction of the two images. The present invention provides a storage grid to present superimposed images on a display screen by utilizing the storage properties of the storage grid in both applications.

It is, therefore, an object of the present invention to provide an improved charge storage tube having a storage grid which allows a superimposition of two images without interaction between the images.

Another object is to provide means for simultaneously impressing two images on a storage grid which results in a display of high intensity of both images.

Still another object is to provide an improved storage grid which will store two images by distinct mechanisms.

A further object is to provide a storage grid on which one image may be imposed by the deposition of charge on the storage material, and the second image may be imposed by localized heating of the storage material with no resulting permanent alteration of the first image.

These and other objects are effected by my invention as will be apparent from the following description taken in accordance with the accompanying drawing throughout which like reference characters indicate like parts, and in which.

Figure 1:
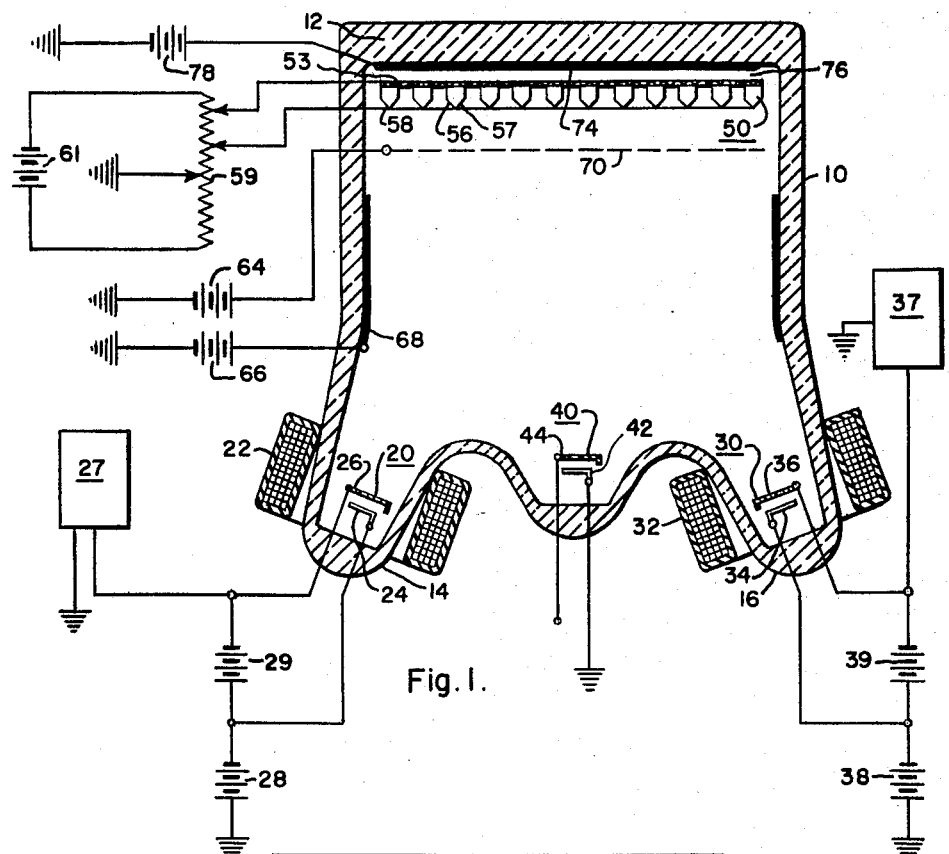
Fig. 1 illustrates a schematic view of a storage tube, partly in section, embodying my invention.

Referring in detail to the drawing, the invention is illustrated embodied in a viewing-type storage tube comprising an evacuated envelope 10 of suitable material, such as glass. The envelope 10 has a transparent faceplate or viewing portion 12 provided at one end of the envelope 10. At the opposite end of the envelope 10, there are provided two neck portions 14 and 16. Electron guns 20 and 30 for generating pencil-type electron beams are positioned, respectively, within the neck portions 14 and 16. A third electron gun 40 is also positioned at the same end of the envelope 10 as the guns 20 and 30 and centrally located for generating a flooding electron beam. Positioned at the opposite end of the envelope 10 with respect to the electron guns and adjacent the faceplate is a storage grid 50. A collector screen 70 is positioned adjacent to the storage grid 50 and on the side facing the electron guns.

The electron gun 20, hereinafter referred to as the write-through gun, provides means of generating an electron beam of small spot size. A suitable deflection means illustrated as an electromagnetic coil 22 is provided around the neck portion 14 for providing means of scanning the electron beam generated by the electron gun 20 to scan the storage electrode 50 in a conventional manner. The electron gun 20 is of suitable type and consists of at least a cathode 24 and a control grid 26. The cathode 24 is connected by suitable conductive means to the exterior of the envelope 10 to the negative terminal of a suitable voltage source illustrated as a battery 28, and the positive terminal of the source 28 is connected to ground. The source 28 may be about 3000 volts. A battery 29 is also connected between the cathode 24 and the control grid 26 so as to place a negative bias on the control grid 26 with respect to the cathode 24 of about 40 volts. A signal source 27 is connected to the control grid 26 for impressing the desired video modulation on the electron beam. The electron gun 20 is positioned with respect to the storage grid 50 so as to approach the plane of the storage grid 50 at an angle to the normal of the plane.

The electron gun 30, hereinafter referred to as the write gun, in the other neck portion 16 is of similar structure as the other electron gun 20 to provide a pencil-type electron beam of the small spot size. Suitable deflection means 32 is provided on the exterior of the neck portion 16 to deflect the electron beam generated by the electron gun 30 to scan a raster on the storage grid 50.

The electron gun 30 is comprised of at least a cathode 34 and control grid 36 with the cathode 34 connected to the negative terminal of a suitable voltage source illustrated as a battery 38 of a potential of about 1500 volts. The positive terminal of the battery 38 is connected to ground. A suitable biasing voltage to provide a negative bias of the order of 40 volts is connected between the control grid 36 and the cathode 34, and is illustrated as a battery 39. A signal source 37 for modulating the intensity of the electron beam generated by the electron gun 30 is connected to the control grid 36. The electron gun 30 is also positioned with respect to the storage grid 50 so as to approach the plane of the storage grid 50 at an agle to the normal of the plane but at a different angle than the beam from electron gun 20.

The centrally located flooding electron beam gun 40 consists at least of a cathode 42 and a control grid 44 with the cathode 42 connected to ground. The flooding gun, as the name indicates, floods the entire storage grid 50 with a uniform electron beam which approaches the grid 50 substantially normal to the plane of the grid 50. The two pencil-type electron guns 30 and 40 are positioned within the envelope, such that their electron beam trajectory to the storage grid is at an angle with respect to the other as well as the normal to the plane of the storage grid 50.

From the foregoing, it can be seen that the storage tube described employs two electron guns 20 and 30 which may be utilized to scan a raster on the storage grid 50, each of which may be supplied with a signal and register a signal-carrying electron beam on the storage electrode 50. As will be described later, the two beams have different effects on the storage grid 50 so as to provide means of placing two separate storage images on the storage grid 50. It should be clear that for the full utilization of the present invention the signal sources 27 and 37 which are connected respectively to the two electron guns 20 and 30 are separate and distinct. For clarification of the subsequent discussion of this device, electron gun 30 is hereinafter termed the write gun and the other electron gun 20 is termed the write-through gun. The term write is taken to mean the imposing of an electrostatic charge image on the storage grid 50, while write-through is taken to mean the imposing on the storage grid an image which is not applied by simple secondary emission.

A wall coating 68 is provided on the inner surface of the envelope 10 between the electron guns and the collector screen 70 and has a potential related to the potential of the collector screen 70 to provide an electric field such that the electrons from the flooding gun 40 approach the plane of the storage grid 50 substantially normal thereto. This collimating field should allow the electrons from the flood gun 40 to approach essentially normal to the grid 50, while still allowing the electrons from guns 20 and 30 to approach the grid at an angle. In a specific embodiment shown, the wall coating 68 is connected to the positive terminal of a voltage source illustrated as a battery 66 of a potential of about 50 volts with the negative terminal connected to ground. The collector screen 70 is connected by means of a lead to the exterior of the envelope 10 and is connected to a voltage source illustrated as a battery 64 having the positive terminal connected to the screen 70 and the negative terminal connected to ground. The potential of this battery is of about 300 volts. A luminescent coating 74 of a suitable phosphor material is provided on the inner surface of the faceplate 12 such that it will provide light emission in response to electron bombardment. It is also normally necessary to provide an electrically conductive and electron permeable coating 76 on the surface of the phosphor facing the storage grid 50 so as to provide means of applying a suitable potential to the phosphor screen. The conducting coating 76, which may be of aluminum, is connected to the exterior of the envelope 10 by means of a lead-in to the positive terminal of a suitable voltage source which is illustrated as a battery 78. The negative terminal of the battery 78 is connected to ground, and the battery 78 is normally of a potential of the order of 5 to 10 kilovolts.

Figure 2:
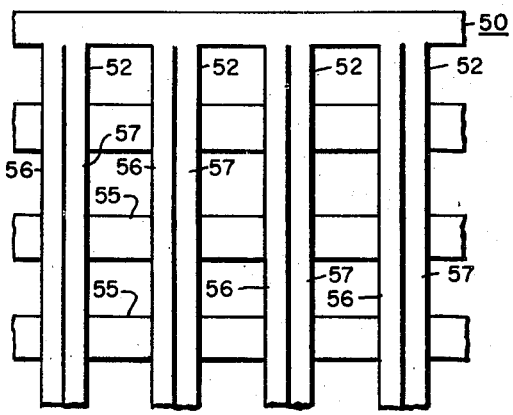
Fig. 2 illustrates a plan view of a storage grid shown in Fig. 1.
Figure 3:
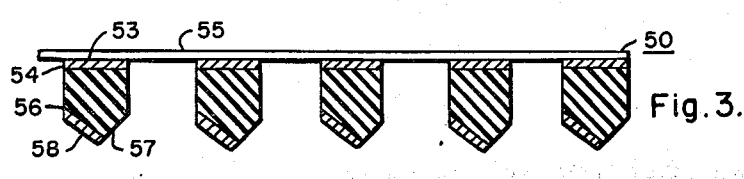
Fig. 3 illustrates a sectional view of a storage grid shown in Fig. 1.

Referring in detail to Figs. 2 and 3 for the structure of the storage grid 50, there is shown a foraminated structure. The storage grid 50 consists of a plurality of vertical parallel strips 52 of a suitable storage material. The strips 52 are supported on the rear surface by an electrically conductive mesh 53. The mesh 53 consists of a plurality of vertical elements 54 which are secured to the strips 52. The mesh 53 also consists of horizontal elements 55 to provide necessary strength. The mesh or back plate 53 is positioned on the rear side of the strips 52 of storage material facing the screen 74.

The front surfaces of each of the strips 52 of the storage grid 50 is formed to provide two angularly disposed surfaces 56 and 57 extending the length of the strips 52. The surface 56 of each of the strips 52 is provided with an electrically conductive coating 58. The coatings 58 are connected together electrically to provide a front plate and are connected on the exterior of the envelope to a tap on a resistor 59. The conductive back plate 53 is also connected to a tap on the resistor 59. The resistor 59 is center tapped to ground and a battery 61 of about 80 volts is connected across the resistor 59 to provide suitable voltage to the storage grid 50. The voltage between the back plate 53 and the front plate 58 may be about ±5 volts.

The storage grid 50 may be produced by any suitable method. One satisfactory method is to provide a wax form or mold having a plurality of grooves of similar cross sections as the strips 52 therein. A suitable storage material is a dielectric having secondary electron emission characteristics of a conventional storage material, that is having a secondary electron emission ratio different from unity at certain bombarding voltages, but is further characterized in that its dielectric constant changes appreciably when the temperature of the material increases. It has been found that a suitable dielectric material is of the class of ferroelectrics which exhibit both of these properties. Suitable ferroelectric materials for this purpose are barium titanate and strontum titanate which are representative of the oxygen-octahedra family of ferroelectrics; Rochelle salt

$$(NaKC_4H_4O_6 4H_2O)$$

which is representative of the tartrate family of ferroelectrics; $KH_2PO_4$ representative of the family of alkali metal dihydrogen phosphate and arsenate family of ferroelectrics; and guanidine aluminum sulfate hexahydrate.

The properties of these and other ferroelectric materials are discussed in an article entitled "Some Aspects of Ferroelectricity," by G. Shirane, F. Jona and R. Pepinsky in December 1955 issue of the Proceedings of the IRE.

As indicated in that article, ferroelectric materials are characterized by a number of properties resulting from their crystallographic structure. The property of particular interest in the present invention is the large change in dielectric constant with temperature which arises from the fact that these materials have a Curie point at which the dielectric constant reaches a high maximum value. An appreciable decrease occurs on either side of the Curie point. Other properties by which ferroelectric materials are characterized are merely incidental to this invention.

A suspension, for example, containing barium and titanium oxides finely ground, is suspended in water in which a suitable organic binder, such as melamine formaldehyde, has been dissolved and introduced into the mold. When the liquid dries, the residue is hard and retains the shape of the mold. It is then necessary to fire the material at elevated temperatures to form barium titanate. This provides a plurality of parallel strips 52 of the dielectric material within the wax mold. A wire mesh 53 of a suitable material, such as tungsten or platinum, is next positioned over the parallel strips of dielectric material and fired at a temperature of about 1400° C. The wax mold is removed prior to the firing. The wire mesh 53 supports the parallel strips 52 of dielectric and also provides a back surface for the dielectric material. It is now necessary to place a conductive coating on one of the two exposed front surfaces of the dielectric strips. This may be done by evaporating a metal coating of a suitable material through a mask. The front conductive coating 58 is deposited on the same side of each of the dielectric strips 52 to a thickness of the order of 1000 angstroms. Such a thickness is required so that a significant heating effect may be obtained from the write-through beam without allowing the write-through electrons to pass through the front conducting surface and modify the charge stored on the storage material.

In the operation of the device shown in the drawing, a suitable video modulation from signal source 37 is applied to the write gun 30, and the electron beam generated is scanned across the storage grid 50 so as to impinge only on the exposed surface 57 of the dielectric strips 52. The voltage of the write gun 30 with respect to the storage grid 50 is such that the electrons strike the storage grid 50 with a velocity between first and second crossover potential of the storage material. In this manner, a charge storage image is written on the exposed surface 57 of the storage grid 50 by secondary emission such that a positive charge with respect to the conductive back surface 53 is provided thereon. If it is now assumed that the charge storage grid is originally at cutoff potential with respect to the flood gun 40, then as the write gun 30 modifies the potential thereon in a positive direction, the electrons from the flood gun 40 will pass through the storage grid 50 and be accelerated by the potential on the phosphor screen 74 so as to bombard the phosphor screen 74 and cause light emission corresponding to the charge image on the storage grid 50.

If the write-through gun 20 is now modulated by a suitable video signal from the source 27, the electron beam generated will scan a raster over the storage grid 50 and impinge only on the front conductive surfaces 58 of the dielectric strips. The electron beam is accelerated to a high potential by means of the potential difference between the cathode 24 of the gun 20 and the storage grid 50 which may be about 3000 volts. The bombardment of the surface 58 by high energy electrons causes localized heating of the conductive front surfaces 58 of the dielectric strips. The heating will correspond to the number or density of the electrons emitted by the write-through gun 20. That is, the greater the number of electrons striking a small area of the front conducting surface 58, the greater will be the local heating effect on that surface. By providing the given angle of trajectory of the two electron guns 20 and 30, the beam from the write-through gun 20 does not impinge to any substantial degree on the uncovered storage dielectric material surface 56 and, therefore, does not interfere with the charge image thereon. The trajectory of the electron beam from the write gun 30 is also such as to not impinge on the surface 58.

The localized heating of the front conductive surface 58 heats the immediate storage material in strip 52 causing the polarization of the storage material in strip 52 to change and hence its potential also. If the dielectric material employed has a decreasing dielectric constant in the range in which the temperature is increasing, a display of maximum intensity may be obtained by maintaining the potential of the front conducting surface 58 a few volts negative with respect to the potential of the conducting back plate 53. If the material is in a region of increasing dielectric constant, the reverse is true. In any case, it is desirable for the potential of the storage material to increase with temperature. This potential change alters the transmission of electrons from the flood gun through the open portions in the storage electrode, and a corresponding light image will be generated on the phosphor screen 17. The length of time the second image is superimposed on the first image depends on the thermal time constant of the grid. This may be adjusted to give as much storage as desired or return to equilibrium temperature as soon as beam leaves the spot. The conductive back plate 53 serves the well-known purpose of determining along with the beam of the write gun the potential of the storage material before the effect of the temperature change due to the write-through beam occurs.

In the specific grid structure, the storage material is shown only vertical strips 54 of the mesh 53 for ease in explaining the invention. The storage material could also be deposited on the horizontal elements 55 of the mesh 53 to provide two areas. One area which would be subject to bombardment from the write gun only and the other area subject to bombardment only by the write-through gun.

There are also other methods of selectively exciting areas of the screen by different electron beams as are well known in the color television art. For example, this could be accomplished by a mask or a deflection grid.

The operation of the storage grid 50 may be explained by considering each small part of the storage grid as consisting of three capacitively coupled electrodes: ($a$) the back conducting surface 53 which is maintained at a fixed potential; ($b$) the front conducting surface 58 which is at a different fixed potential; and ($c$) the surface 57 of storage material which bears charge deposited by the write gun. There is a capacitance between each of these electrodes since they are separated by a dielectric: $C_{ab}$, $C_{bc}$ and $C_{ac}$. $C_{ab}$ is not of interest here since the potential from 58 to 53 does not change. Due to the heating effect of the write-through beam, the dielectric constant of the storage material will increase or decrease depending on the specific material used and the temperature range. As shown in the article "Applications of Ferroelectric Materials," by E. E. Riches, in British Communications and Electronics, April 1957, a mixture of 65% $BaTiO_3$ and 35% $SrTiO_3$ shows a marked decrease in dielectric constant above about 20° C., its Curie temperature. This is a convenient material when operating at room temperature or above. When the write-through beam is applied and the dielectric constant decreases, the interelectrode capacitances will decrease. This effect takes place to a greater degree near the front conducting surface causing $C_{bc}$ to decrease by a greater proportion than $C_{ac}$ decreases. Since the charge on ($c$) (storage material) is fixed, its potential becomes more positive (increases). The desirable effect is to drive the potential of ($c$) closer to that of ($a$). This will occur when $V_a$ is greater than $V_b$. If the material used has an increasing dielectric constant in the temperature range the device must operate, then $V_a$ should be less than $V_b$. The result in either case is that more flood electrons pass through the grid in accordance with the signal carrying write-through beam.

To achieve the foregoing the front conducting surface 58 and the conducting back plate 53 are operated at small potential differences as conditions may require. The electrons from write gun 30 are accelerated through a potential relative to the potential of storage electrode 50 which is normal for such conventional write guns, and those from write-through gun 20 are accelerated through a potential higher than that of the write gun 30; the electron current from the write-through gun 20 may also be higher than that from the write gun 30, so that the heating effect of the beam from the write gun 30 will be small compared to that of the beam from the write-through gun 20. Flood gun 40 is maintained at approximately the same potential as storage electrode 50 while collector screen 70 has a positive potential relative to the storage grid 50 for the purpose of collecting secondary electrons therefrom. The potentials of collector screen 70 and wall electrode 68 are so related so that electrons from flood gun 40 are accelerated to a greater extent perpendicular to storage grid 50 rather than parallel thereto. The phosphor coating 74 is maintained at a high positive potential with respect to the storage grid 50. Means of applying these voltages may be quite conventional and are shown only schematically in the attendant drawing.

While I have shown and described my invention in only certain forms, it will be obvious to those skilled in the art that it is not so limited but is susceptible of various other changes and modifications without departing from the spirit and scope thereof.

I claim as my invention:

1. An electronic storage tube comprising a storage electrode, said storage electrode including a layer of ferroelectric material which has the property of substantial variation of dielectric constant with temperature, a first electrical conductive layer on one surface of said dielectric layer and a second electrical conductive layer on a portion of the other surface of said ferroelectric layer with the remainder of said other surface exposed.

2. An electronic storage tube comprising an apertured storage electrode including a layer of ferroelectric material exhibiting the property of substantial variation of dielectric constant with temperature and exhibiting the property of a surface secondary electron emission ratio differing from unity, said layer having a front surface and a back surface, an electrical conductive coating provided on said back surface of said layer, the front surface of said layer provided with a first and second portion, said first portion having a thin conductive coating provided thereon in intimate contact with said layer and the second portion of said front surface being exposed.

3. An electronic storage display tube comprising a display screen of a material capable of emission of light upon electron bombardment, a storage grid adjacent to said display screen having a plurality of apertures therein, said storage grid comprised of a layer of insulating material which has the property of variation of dielectric constant with temperature and also exhibiting the property of a surface secondary electron emission ratio differing from unity, said layer having a front surface and a back surface, an electrical conductive electrode positioned on the back surface of said insulating layer facing said display screen, the front surface of said storage grid comprised of a first and a second portion, means for generating a first electron beam for scanning the front surface of said storage grid to bombard only the first portion of said front surface to deposit an electrostatic charge thereon, means for generating a second electron beam for scanning the front surface of said storage electrode to bombard only the second portion of said front surface and thereby modify the voltage on said first portion of said front surface.

4. An electronic storage tube comprising a display screen capable of emission of light in response to electron bombardment, an apertured storage grid positioned adjacent to said display screen, said storage grid comprising a layer of insulating material exhibiting the property of variation of dielectric constant with temperature and also secondary electron emission from the surface thereof, said layer having a front surface and a back surface, an electrical conductive coating provided on the back surface of said apertured insulating layer and facing said display screen, the front surface of said layer comprised of a first and a second portion, said first portion being exposed and capable of secondary electron emission in response to electron bombardment, said second portion having a thin electrical conductive coating thereon in intimate thermal contact with said insulating layer, means for establishing a fixed potential between said back surface conductive coating and said front surface conductive coating, means for directing a first electron beam onto the exposed portion of said front surface to provide a first voltage image thereon corresponding to the modulation applied to said first electron beam, means for directing a second electron beam toward said storage grid to flood uniformly the entire storage grid and to produce a light image on said display screen corresponding to the first voltage image impressed on said storage grid, means for superimposing a second voltage image on said first image comprising means for directing a third electron beam to scan only the front conductive portion of said front surface, said third beam being of such an intensity to heat said front conductive surface and the adjoining region of said insulating layer to modify the dielectric constant of the insulating material between said front conductive coating and said exposed portion of said front surface to modify thereby the voltage on said exposed surface.

5. An electronic storage tube comprising a display screen capable of emission of light in response to electron bombardment, an apertured storage electrode positioned adjacent to said display screen, said storage electrode comprising an apertured layer of insulating material exhibiting the property of variation of dielectric constant with temperature and also secondary electron emission from the surface thereof, said insulating layer having a front surface and a back surface, an electrical conductive coating provided on the back surface of said apertured insulating layer facing said display screen, the front surface of said insulating layer comprised of a first and a second area in a predetermined relationship, said first area being exposed and capable of secondary electron emission in response to electron bombardment, said second area having a thin conductive coating thereon in intimate thermal contact with said insulating layer, means for supplying an electric potential to said front conducting coating, means for establishing a fixed potential between said back conductive coating and said front conductive coating, means for directing a first electron beam onto the exposed area of said front surface to provide a charge image thereon corresponding to intensity modulation applied to said electron beam, said charge image providing a first voltage image proportional to the charge image, means for directing a second electron beam toward said storage grid to uniformly flood the entire storage grid and to produce a light image on said display screen corresponding to said first voltage image impressed on said storage grid, means for superimposing a second voltage image on said first voltage image comprising means for applying heat to said front conductive coating and the adjoining region of said insulating layer adjacent said exposed area to modify the dielectric constant of the insulating material between said front conductive coating and said exposed area of said front surface to thereby modify said first voltage image on said exposed area.

6. An electronic storage tube comprising an electron sensitive target, an apertured storage electrode positioned adjacent to said target, said storage electrode comprising a plurality of elements of insulating material exhibiting the property of variation of dielectric constant with temperature and also secondary electron emission from the surface thereof, said insulating elements having a front surface and a back surface, an electrical conductive coating provided on the back surface of said insulating elements facing said target, the front surface of said insulating elements comprised of a first and a second area, said first area providing an exposed surface capable of secondary electron emission in response to electron bombardment, said second area having a thin conductive coating thereon in intimate thermal contact with said insulating element, means for supplying an electric potential to said front conductive coating, means for establishing a fixed potential between said back conductive coating and said front conductive coating, means for directing a first electron beam onto the exposed area of said front surface of said elements to provide a charge thereon corresponding to the modulation applied to said first electron beam, said charge providing a first voltage proportional to said charge, means for superimposing a second voltage of predetermined time duration on said first voltage comprising means for directing a third electron beam for bombarding only the front conductive coating of said front surface and of such an intensity to heat said front conductive coating and the adjoining region of said insulating element to modify the dielectric constant of the insulating element between said front conductive coating and said exposed area of said front surface to thereby modify the voltage on said exposed area.

7. An electronic storage tube comprising a storage electrode, said storage electrode including a layer of dielectric material which has the property of substantial variation of dielectric constant with temperature, a first electrical conductive layer on one surface of said dielectric layer and a second electrical conductive layer on a portion of the other surface of said dielectric layer with the remainder of said other surface exposed, means for impressing an electrostatic charge image on the exposed surface of said dielectric layer and means for producing temperature changes in selected areas of said second electrical conductive layer so that the dielectric constant of said dielectric layer in adjacent regions is thereby altered.

8. An electronic storage tube comprising an apertured storage electrode inclduing a layer of dielectric material exhibiting the property of substantial variation of dielectric constant with temperature, said layer having a front surface and a back surface, the front surface of said layer provided with a first and second portion, said first portion having a thin conductive coating provided thereon in intimate contact with said layer and the second portion of said front surface being exposed, means for impressing an electrostatic charge image on said second portion of said front surface and means for producing temperature changes in selected areas of said first portion of said front surface so that the dielectric constant of said second portion in adjacent regions is thereby altered.

References Cited in the file of this patent

UNITED STATES PATENTS

| | | |
|---|---|---|
| 2,793,288 | Pulvari | May 21, 1957 |
| 2,872,612 | De Lano et al. | Feb. 3, 1959 |

FOREIGN PATENTS

| | | |
|---|---|---|
| 692,337 | Great Britain | June 3, 1953 |